(12) United States Patent
Ling

(10) Patent No.: US 9,277,357 B2
(45) Date of Patent: *Mar. 1, 2016

(54) METHOD AND SYSTEM FOR MAP GENERATION FOR LOCATION AND NAVIGATION WITH USER SHARING/SOCIAL NETWORKING

(71) Applicant: Maxlinear, Inc., Carlsbad, CA (US)

(72) Inventor: Curtis Ling, Carsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,180

(22) Filed: Dec. 9, 2014

(65) Prior Publication Data

US 2015/0148069 A1 May 28, 2015

Related U.S. Application Data

(63) Continuation of application No. 13/351,655, filed on Jan. 17, 2012, now Pat. No. 8,908,914.

(51) Int. Cl.
| | |
|---|---|
| *G06K 9/00* | (2006.01) |
| *H04W 4/02* | (2009.01) |
| *G06F 17/30* | (2006.01) |
| *G01C 21/20* | (2006.01) |
| *H04N 5/225* | (2006.01) |

(52) U.S. Cl.
CPC .............. *H04W 4/02* (2013.01); *G01C 21/206* (2013.01); *G06F 17/30241* (2013.01); *H04N 5/225* (2013.01)

(58) Field of Classification Search
None
See application file for complete search history.

(56) References Cited

U.S. PATENT DOCUMENTS

| | | |
|---|---|---|
| 2008/0040036 A1 | 2/2008 | Peters et al. |
| 2008/0133126 A1 | 6/2008 | Dupray |
| 2011/0064312 A1* | 3/2011 | Janky et al. ................... 382/195 |
| 2011/0096992 A1 | 4/2011 | Uusitalo et al. |
| 2013/0212094 A1* | 8/2013 | Naguib et al. ................ 707/730 |

OTHER PUBLICATIONS

PCT, International Search Report and Written Opinion in International application No. PCT/US13/21930, dated Mar. 22, 2013 (10 pages).

* cited by examiner

*Primary Examiner* — Atiba O Fitzpatrick
(74) *Attorney, Agent, or Firm* — McAndrews Held & Malloy

(57) ABSTRACT

Methods and systems for map generation for location and navigation with user sharing/social networking may comprise a premises-based crowd-sourced database that receives images and location data from a plurality of users of wireless communication devices, and for each of said plurality of users: receiving a determined position of a wireless communication device (WCD), where the position is determined by capturing images of the surroundings of the WCD. Data associated with objects in the surroundings of the WCD may be extracted from the captured images, positions of the objects may be determined, and the determined positions and the data may then update the premises-based crowd-sourced database. The position of the WCD may be determined utilizing global navigation satellite system (GNSS) signals. The elements may comprise structural and/or textual features in the surroundings of the WCD. The position may be determined utilizing sensors that measure a distance from a known position.

23 Claims, 13 Drawing Sheets

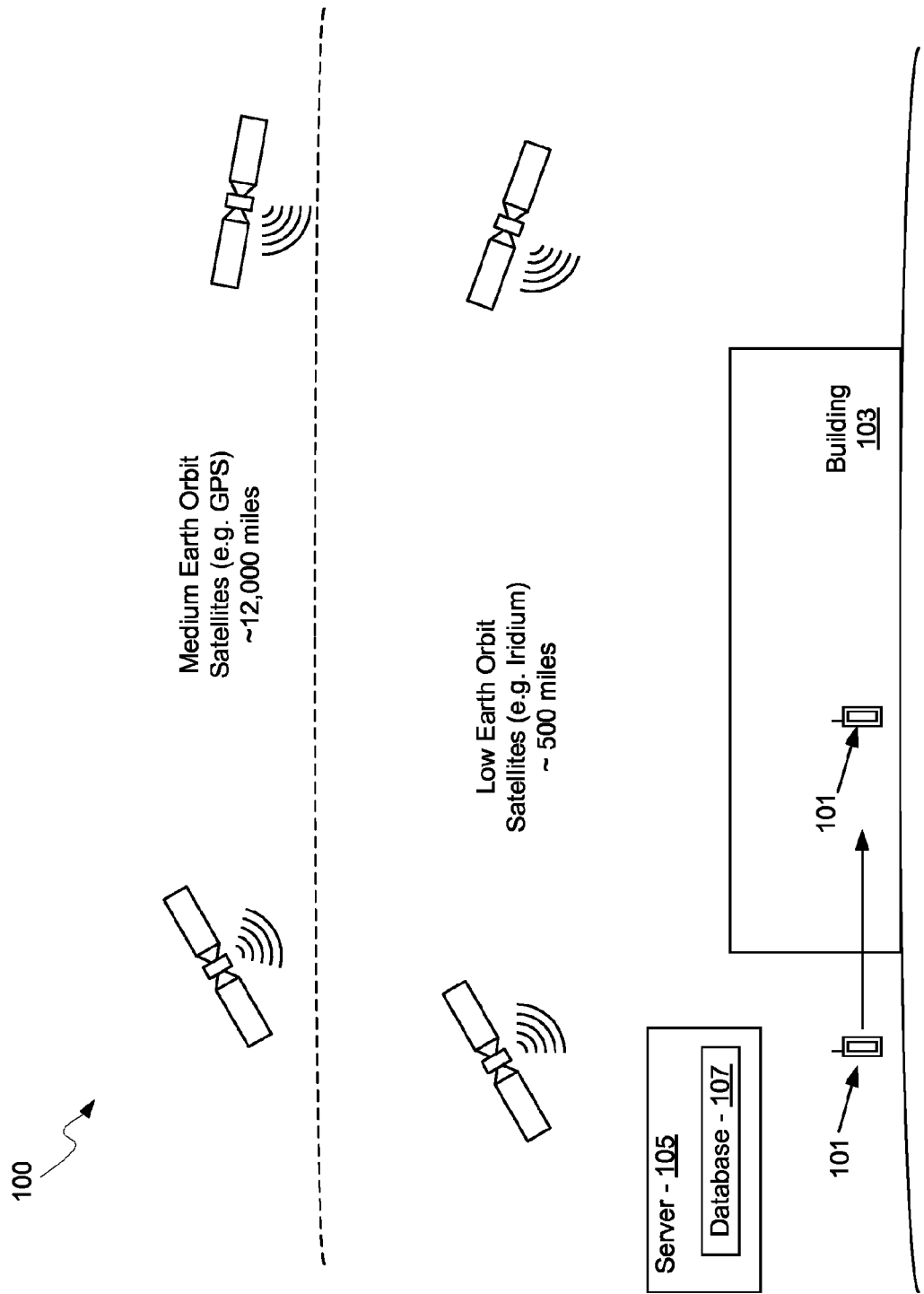

METHOD AND SYSTEM FOR MAP GENERATION FOR LOCATION AND NAVIGATION WITH USER SHARING/SOCIAL NETWORKING

This application is a continuation of application Ser. No. 13/351,655 filed on January 17, which is incorporated herein by reference in its entirety.

FIELD OF THE INVENTION

Certain embodiments of the invention relate to wireless device positioning. More specifically, certain embodiments of the invention relate to a method and system for map generation for location and navigation with user sharing/social networking.

BACKGROUND OF THE INVENTION

Wireless communication devices with global location navigation system (GNSS) capability are becoming more prevalent. These devices depend on RF signals received from satellites for calculating position. However, these satellite signals are weak and are attenuated when inside buildings such that wireless devices can no longer obtain a lock on the signals and thus can no longer determine location.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for map generation for location and navigation with user sharing/social networking, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram of an exemplary wireless device with positioning and map generating capability, in accordance with an embodiment of the invention

DETAILED DESCRIPTION OF THE INVENTION

Figure 1B:
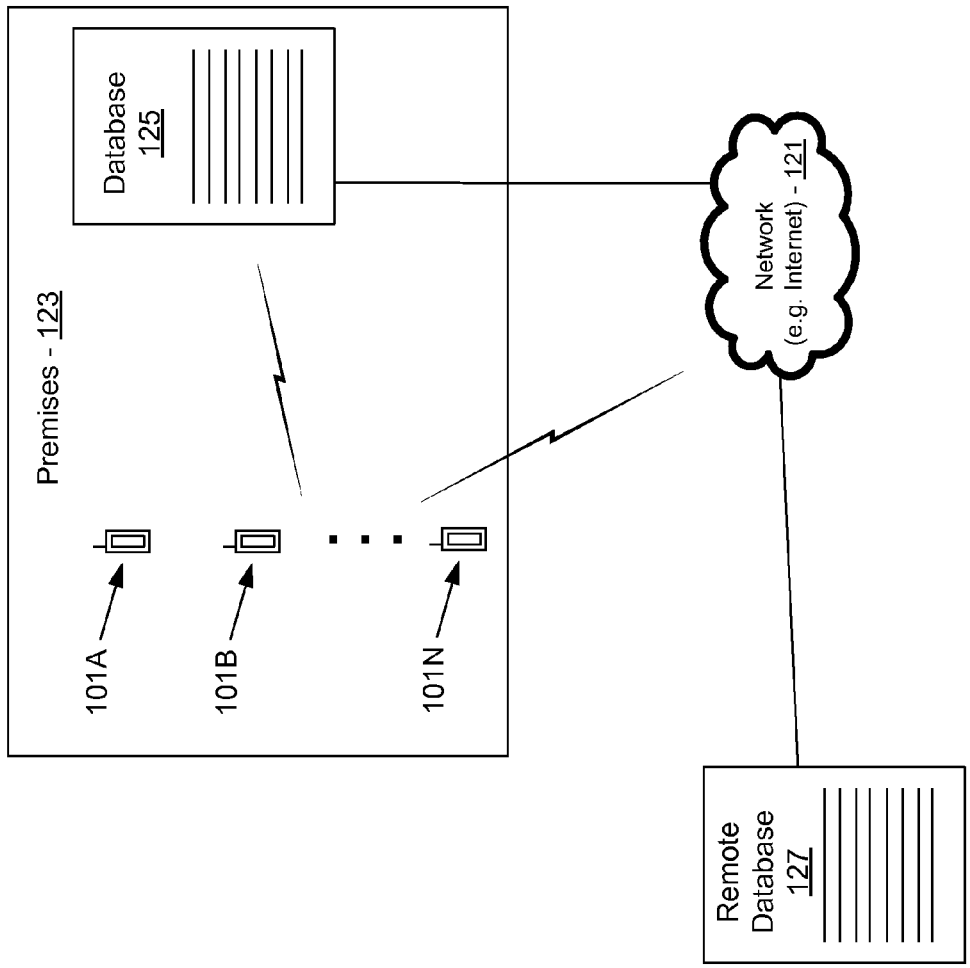
FIG. 1B is a block diagram illustrating remote and on-premises databases, in accordance with an embodiment of the invention.

Certain aspects of the invention may be found in a method and system for map generation for location and navigation with user sharing/social networking. Exemplary aspects of the invention may comprise determining a position of a wireless communication device and capturing one or more images of the surroundings of the wireless communication device. Data associated with objects in the surroundings of the wireless device may be extracted from the one or more captured images and positions of the objects may be determined, and the determined positions and the data may then be uploaded to a database. The position of the wireless communication device may be determined utilizing global navigation satellite system (GNSS) signals. The data associated with the objects may comprise structural features in the surroundings of the wireless communication device. The data associated with the objects may comprise textual features in the surroundings of the wireless communication device. The position of the wireless communication device may be determined utilizing one or more sensors in the wireless device to measure a distance from a last determined or known position. The one or more sensors may comprise one or more of: a pedometer, an altimeter, gyroscopes, multi-dimensional accelerometers, a camera, and a multidimensional compass. The positions of the extracted elements may be determined utilizing known optical characteristics of a camera in the wireless communication device. The database may comprise one or more of: a plurality of images, abstractions of images, and locations and may be stored on a remote server. The position of the wireless communication device may be determined utilizing medium Earth orbit satellite signals and/or low Earth orbit satellite signals.

FIG. 1A is a diagram of an exemplary wireless device with positioning and map generating capability, in accordance with an embodiment of the invention. Referring to FIG. 1A, there is shown a wireless device 101 and the server 105, which may comprise a database 107. The wireless device 101 may comprise any wireless communication device (e.g. smart phone) or vehicle where its user may desire to know the location of such device or vehicle. The wireless device 101 may comprise a global navigation satellite system (GNSS) receiver that may be operable to receive medium Earth orbit (MEO) satellite signals and low Earth orbit (LEO) satellite signals.

There is also shown MEO satellites (e.g. GPS satellites), and LEO satellites (e.g. Iridium communication satellites). Medium Earth orbit satellites may be at a height of about 12,000 miles above the surface of the Earth, compared to about 500 miles above the surface for low Earth orbit satellites. Therefore, the signal strength of LEO satellite signals is much stronger than MEO satellite signals. LEO satellites may be used for telecommunication systems, such as satellite phones, whereas MEO satellite systems may be utilized for location and navigation applications.

In certain circumstances, satellite signals may be attenuated when the wireless device 101 enters a building, such that the wireless device may not be able to utilize satellite signals to determine its location. In this instance, it may be desirable to determine the location of the wireless device 101 utilizing other techniques.

In an exemplary embodiment, the wireless device 101 may determine its location via GNSS when outside the building 103. In instances where the building 103 attenuates satellite signals to such a level that the wireless device 101 can no longer obtain a lock for GNSS positioning purposes, the wireless device 101 may utilize low Earth orbit satellite signals. In another exemplary scenario, the wireless device 101 may determine its location via sensors within the device. For example, the wireless device may track its location while outside the building 103 utilizing MEO and/or LEO GNSS positioning, and may utilize a pedometer and a compass to determine position within the building.

In addition, the wireless device 101 may capture images or video from within the building 103 and may correlate these images to determined positions. This data may then be uploaded to the database 107, thereby generating a map of the building. This process may be carried out by a number of wireless devices, which may be utilized to generate a more complete map with multiple users uploading images and positioning data.

In an exemplary scenario, the structural or textual information may comprise product barcodes. For example, a user may be stocking a store shelf with products and may capture images of barcodes of the products. With the known position of the wireless device 101, the product barcodes may be uploaded to the database 107, thereby generating a map of all products in the store, which may be used by subsequent customers to either determine their own location or where desired products are located, and how to get there.

In another exemplary scenario, data from users may be weighted based on their trustworthiness. For example, if the initial positioning on a particular wireless device is not accurate to a small enough range, and thus subsequent positioning points are not accurate, this data may be weighted less than data following more accurate positioning.

The uploaded data may comprise locations of structural features such as the corners of the building, entrances, fountains, columns, and storefronts, for example. In another exemplary scenario, the uploaded data may comprise images of text and/or text extracted from images of signs or other sources of text. These modalities are collectively referred to as structural and textual maps.

FIG. 1B is a block diagram illustrating remote and on-premises databases, in accordance with an embodiment of the invention. Referring to FIG. 1B, there are shown wireless devices 101A-101N, a premises 123, an on-premises database 125, a network, such as the Internet, 121, and a remote database 127. The premises 123 may comprise a building or other structure where users of the wireless devices 101A-101N may desire positioning and navigation capability but conventional positioning technology, such as GNSS, is inadequate.

The on-premise database 125 may comprise characteristics relating to the premises 123, such as structural or textual elements visible to people in the premises 123. For example, the on-premises database may comprise a map of the premises 123 with features that may aid in positioning and navigation, such as walkways, entrances, signs, corners, bridges, fountains, etc. Data may be uploaded to the on-premises database 125 by the wireless devices 101A-101N. In this manner, visitors to the premises 123 may create and subsequently improve the detail and quantity of the stored data. In another exemplary scenario, a minimal database structure may be created by the management of the premises 123, and may comprise a simple map of the premises 123. Subsequent improvements and additions to the on-premises database 125 may be uploaded by users of the wireless devices 101A-101N when they frequent the premises 123.

The on-premises database 125 may be accessed directly from within the premises 123 via a wireless connection such as WiFi, Bluetooth, Zigbee, a femtocell, etc. Similarly, the on-premises database 125 may be accessed via the network (e.g., Internet) 121, where, in the case network 121 comprises the Internet, the wireless devices 101A-101N may utilize any preferred connection to the Internet.

The remote database 127 may be substantially similar to the on-premises database 125, but found at an external location, for security or reliability reasons, for example. Similarly, the remote database 127 may be managed by an entity independent from the premises 123, and may store information for many premises.

Figure 2A:
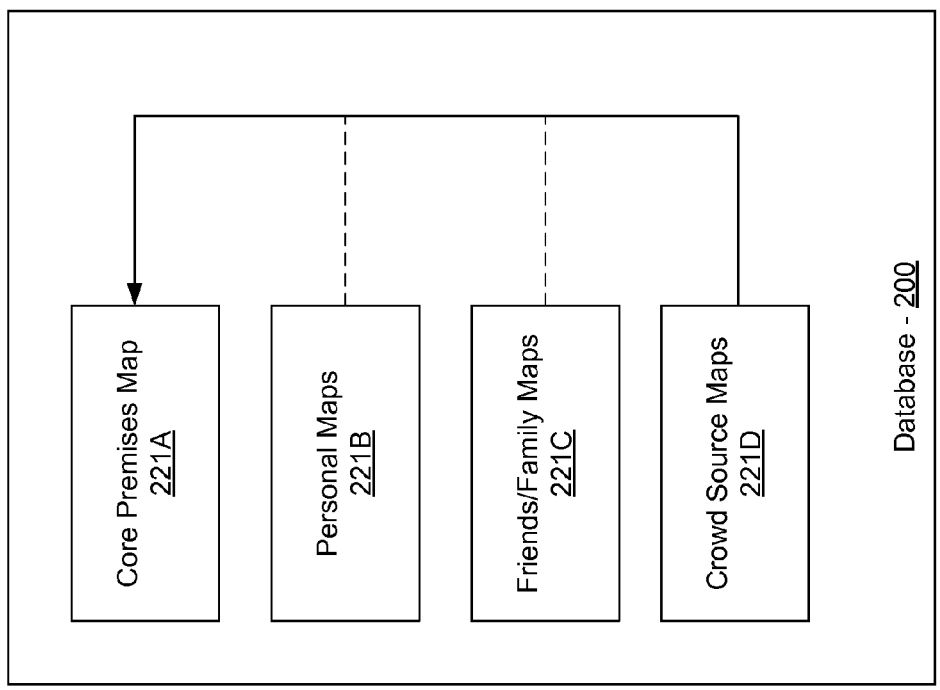
FIG. 2A is a block diagram illustrating an exemplary premises database, in accordance with an embodiment of the invention.

FIG. 2A is a block diagram illustrating an exemplary premises database, in accordance with an embodiment of the invention. Referring to FIG. 2A, there is shown a database 200 comprising a core premises map 221A, personal maps 221B, friends and family maps 221C, and crowd source maps 221D. Each of the maps in the database 200 may be stored in a local server found on-premises, stored on a remote server, or in a cloud computing architecture, for example.

The core premises map 221A may comprise the basic level map of a premises. It may comprise the map generated by the premises management, for example, and may be the basis for more detailed maps as users upload more information. In an exemplary scenario, the core premises map 221A may be stored locally, such as the on-premises database 125. In another exemplary scenario, the core premises map 221A may be generated by an outside entity that generates maps for different premises and stores them remotely from the premises, such as the remote database 127. The core premises map 221A may comprise an overall map of the premises as well as structural and textual features of the premises.

The personal maps 221B may comprise maps generated by users for their own use and may be based initially on the core premises map 221A. For example, a user may start with the core premises map 221A and add personalized features, such as commonly visited stores or restaurants. For example, a user may frequent a large and complex department store and may want occasional assistance with navigation to different sections of the store. The personal maps 221B may allow access by other users, or may be secured for a single user, as per user preferences and indicated by the dashed line. Additionally, or alternatively, the personal maps 221B may be generated and stored on one or more mobile user device, such as on one or more of the wireless devices 101A-101N shown in FIG. 1B.

The friends and family maps 221C may comprise maps generated by one or more users for a targeted group of users.

For example, a user may generate a map of preferred stores, or even products and their locations in those stores, for their spouse or other family members for gift shopping. The friends and family maps 221C may comprise images of structures or text that would assist other users in navigating to desired locations. The security of the friends and family map 221C may be defined by the user that generated it, for example, and may allow access from a limited number of users. Additionally, or alternatively, the friends and family maps 221C may be generated and stored on one or more mobile user device, such as on one or more of the wireless devices 101A-101N shown in FIG. 1B.

The crowd source maps 221D may comprise a database of elements of a premises as modified by all users that capture and upload images and/or data. As more and more users take images from different locations and orientations to structures and text seen in a premises, the database may become more detailed and more accurate for future users. The crowd source maps 221D may be associated with social networking sites, for example, where users may indicate their location in a premises and include one or more captured images. In this manner, other users may be directed to that location to meet with people with similar interests, for example.

Figure 2B:
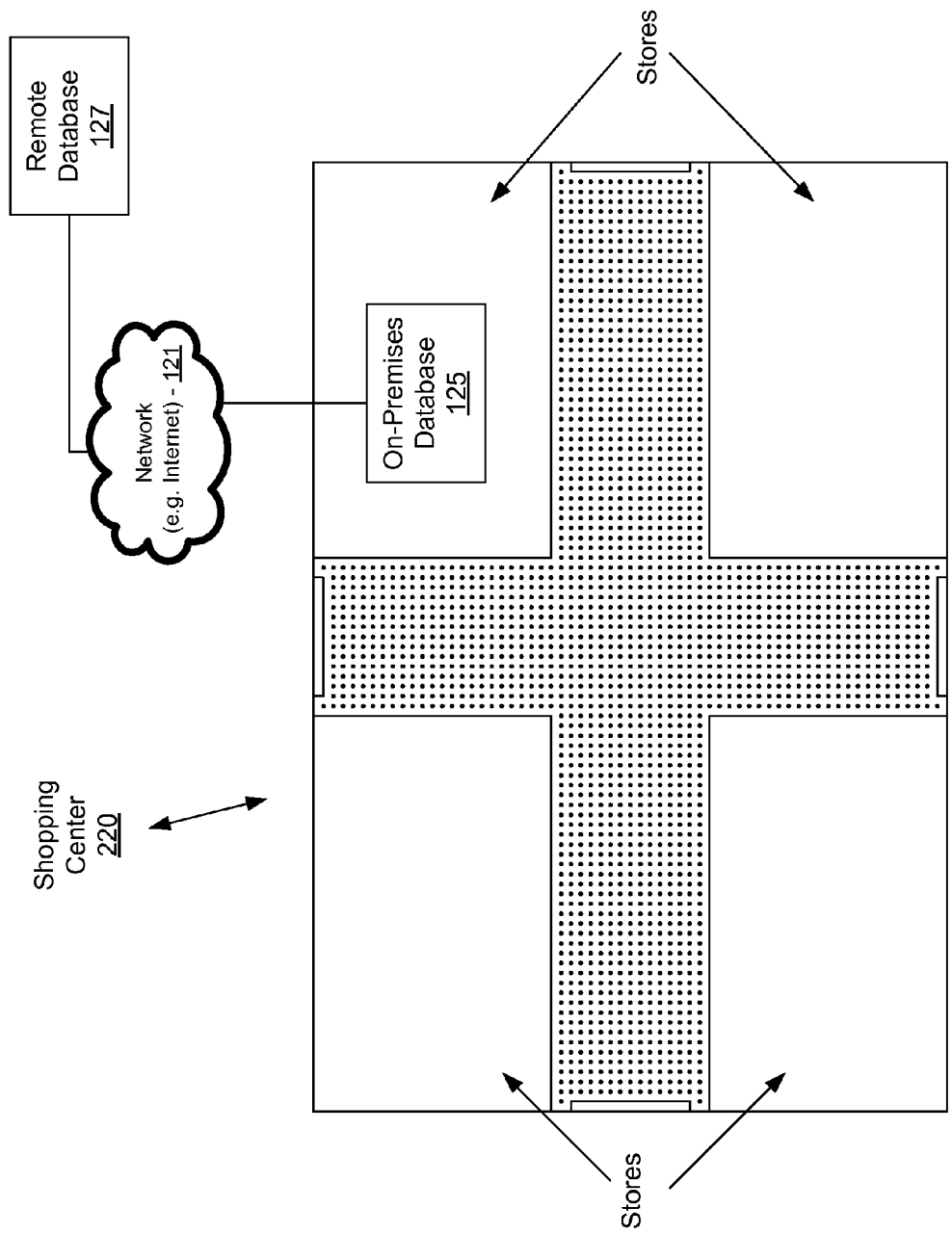
FIG. 2B is a diagram illustrating an exemplary map database generation grid, in accordance with an embodiment of the invention.

FIG. 2B is a diagram illustrating an exemplary map database generation grid, in accordance with an embodiment of the invention. Referring to FIG. 2B, there is shown a shopping center 220 with various stores, the on-premises database 125, a network, such as the Internet, 121, and the remote database 127. The on-premises database 125 and the remote database 127 may be as described with respect to FIG. 1B, for example.

In an exemplary scenario, the shopping center 220 may be mapped out for structural and/or textual element databases, such that images may be taken from each point on a grid in the shopping center 220 resulting in a plurality of perspectives on the structural and textual elements. The position of each grid point may be calculated or measured, or known a priori, when an image is captured. Each image and its position may be stored in the on-premises database 125 and/or the remote database 127. Similarly, elements may be extracted from the images for upload to the databases. For example, text may be extracted from captured images and associated with a distance and direction from the position where the image was captured.

The map generated from taking images from each point on a grid in the shopping center 220 may comprise a core database corresponding to the core premises map 221A, for example. This core database may be generated by a proprietor and/or owner of a premises, or by a third party service provider. The owner and/or proprietor of the premises, or the third party service provider, may control and/or own the on-premises database 125 and/or the remote database 127. The map may subsequently be added to and/or refined by users, resulting in more detailed personal or crowd-sourced maps.

Figure 2C:
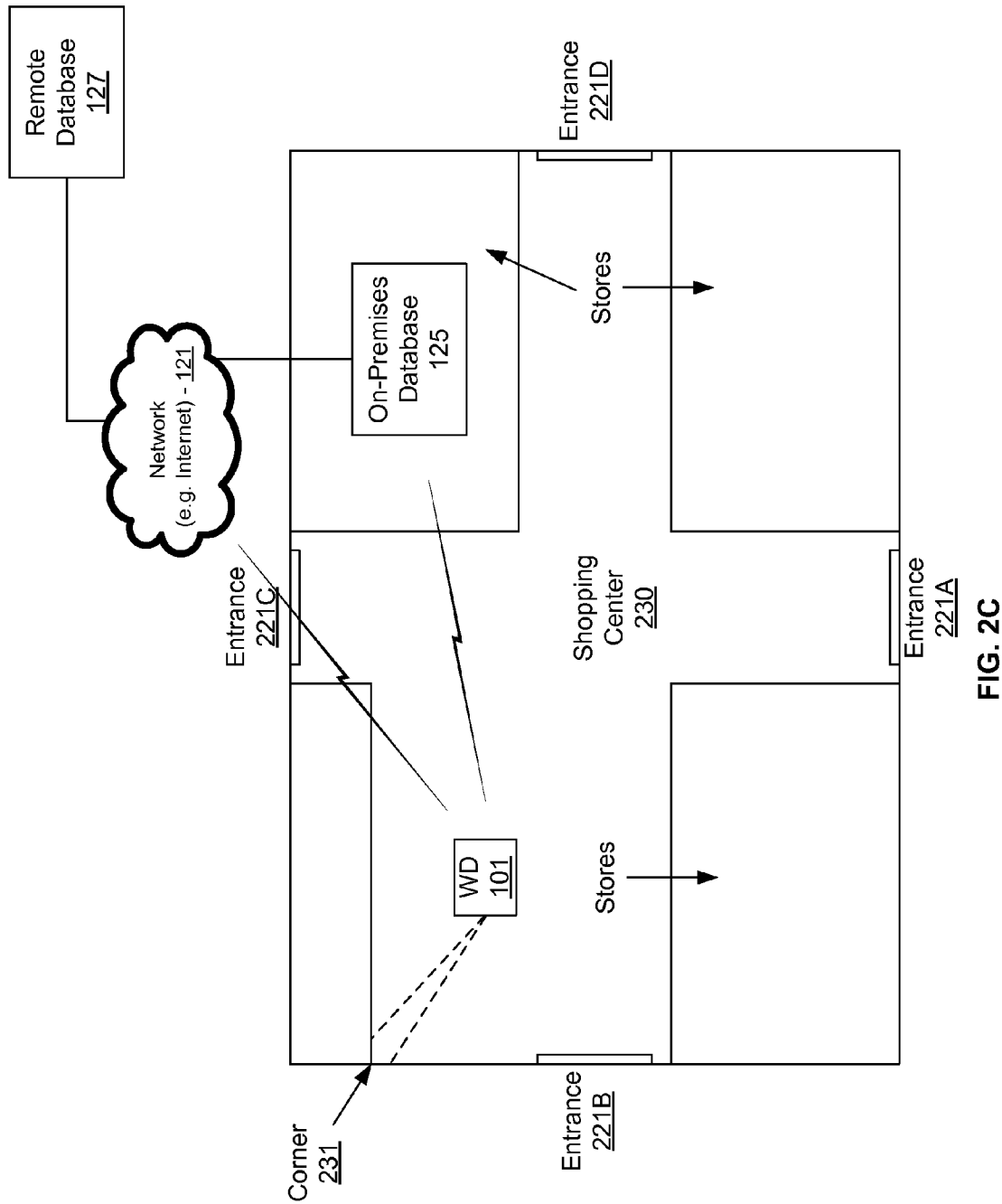
FIG. 2C is a diagram illustrating an exemplary wireless device positioning for database upload performed inside a structure based on corners of the structure, in accordance with an embodiment of the invention.

FIG. 2C is a diagram illustrating an exemplary wireless device positioning for database upload performed inside a structure based on corners of the structure, in accordance with an embodiment of the invention. Referring to FIG. 2C, there is shown a shopping center 230 with various stores, the wireless device 101, a network, such as the Internet, 121, the on-premises database 125, the remote database 127, entrances 221A-221D, and a corner 231.

In an exemplary scenario, the wireless device 101 may be operable to determine its position within the shopping center 230 via one or more techniques. For example, the wireless device 101 may comprise a compass such that it can determine what direction the wireless device 101 is facing when capturing an image of a corner of the building, such as the corner 231. The distance between the wireless device 101 and the corner 231 may be calculated from the captured image based on the known optical characteristics of the camera in the wireless device 101, for example.

The position of the wireless device may be calculated from the distance and direction traveled by the wireless device 101 since its last known position. In another exemplary scenario, the external perimeter of the shopping center 230 may be known from a map application, for example, and may be utilized to determine a position of the inner corner, the corner 231, of the shopping center 230, and subsequently determine other structures and text, and their positions, as captured by the wireless device 101 that may be uploaded to the database.

The mapping out of the inner perimeter, such as the corner 231 and other corners in the shopping center 230 may be utilized to generate a core structural map to be stored on the on-premises database 125 and/or the remote database 127.

Figure 2D:
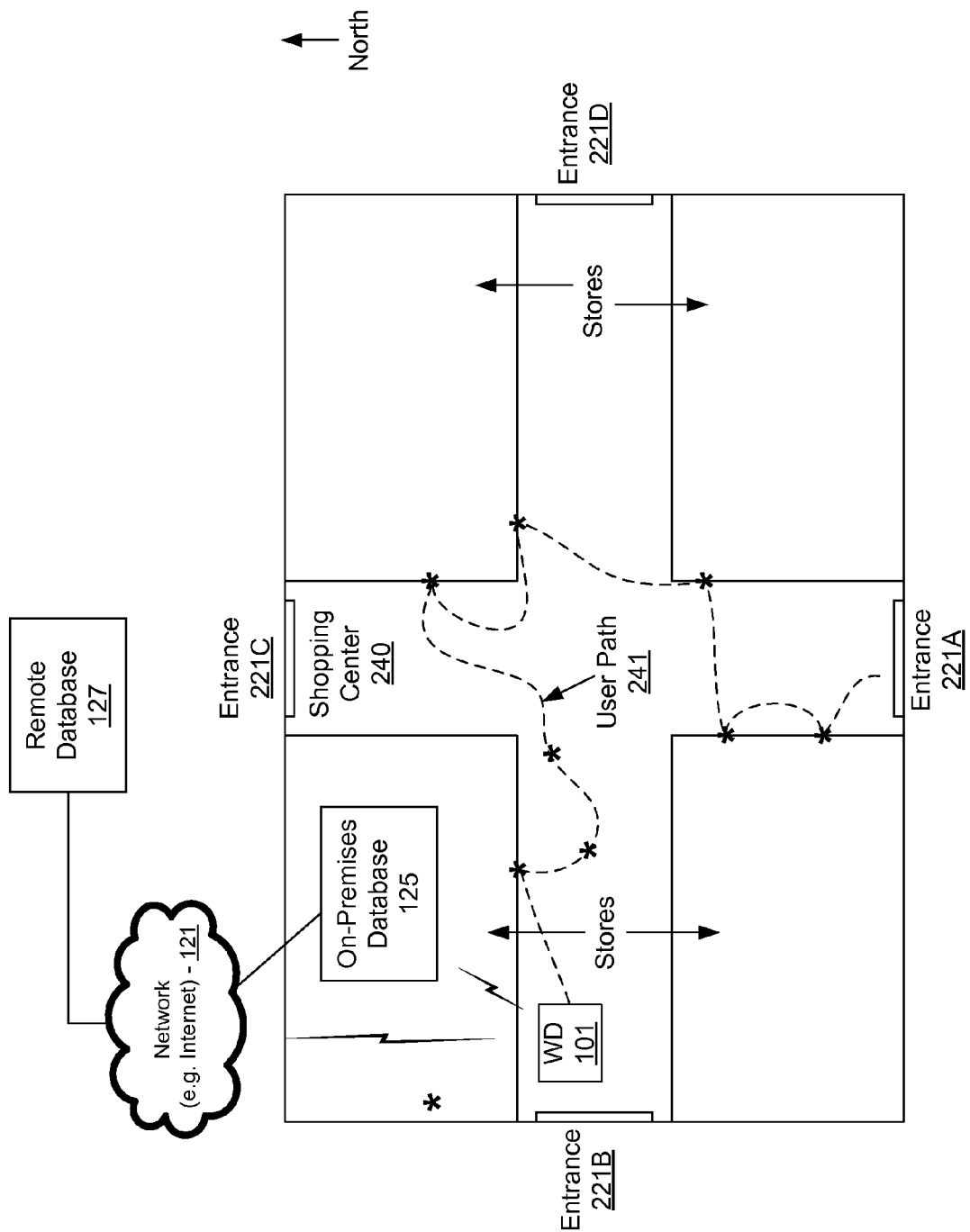
FIG. 2D is a diagram illustrating an exemplary wireless device positioning for database upload performed inside a structure based on a user's path inside the structure, in accordance with an embodiment of the invention.

FIG. 2D is a diagram illustrating an exemplary wireless device positioning for database upload performed inside a structure based on a user's path inside the structure, in accordance with an embodiment of the invention. Referring to FIG. 2D, there is shown a shopping center 240 with various stores, the wireless device 101, a network, such as the Internet, 121, the on-premises database 125, the remote database 127, entrances 221A-221D, and a user path 241.

In an exemplary scenario, the wireless device 101 may be operable to determine its position within the shopping center 230 via various techniques. For example, the wireless device 101 may comprise a compass such that it can determine what direction the wireless device 101 is facing and may also comprise a pedometer and altimeter for determining the distance the user of the wireless device 101 has traveled based on the number of steps taken since the last known position, such as determined by GNSS. The wireless device 101 may determine its position by calculating a distance traveled using a pedometer and an altimeter, if necessary (i.e., if the user has travelled to a different level or floor of the shopping center 230), in conjunction with the direction traveled as determined by a compass. The distance from the last known GNSS position may be determined by integrating the steps taken over the direction that the wireless device 101 traveled as determined by a compass, for example.

The wireless device 101 may capture images along the user path 241, indicated by asterisks on the user path 241, extract elements such as structures and textual information, calculate their positions, and upload this data to the database for the shopping center 240. Data may comprise the captured images and extracted elements such as physical structures and/or text, with their associated positions as determined by the wireless device 101.

Data and captured images may be uploaded to the on-premises database 125 and/or the remote database 127. With data and images uploaded by users taking different paths, such as the user path 241 as one example, the databases may be become more detailed and accurate, and may be used for personal services. For example, a user of the wireless device 101 may generate a map along the user path 241 that they may share with a spouse or other people for gift purchases. Specific items and their locations may be stored in the user-specific data stored in the database.

Figure 2E:
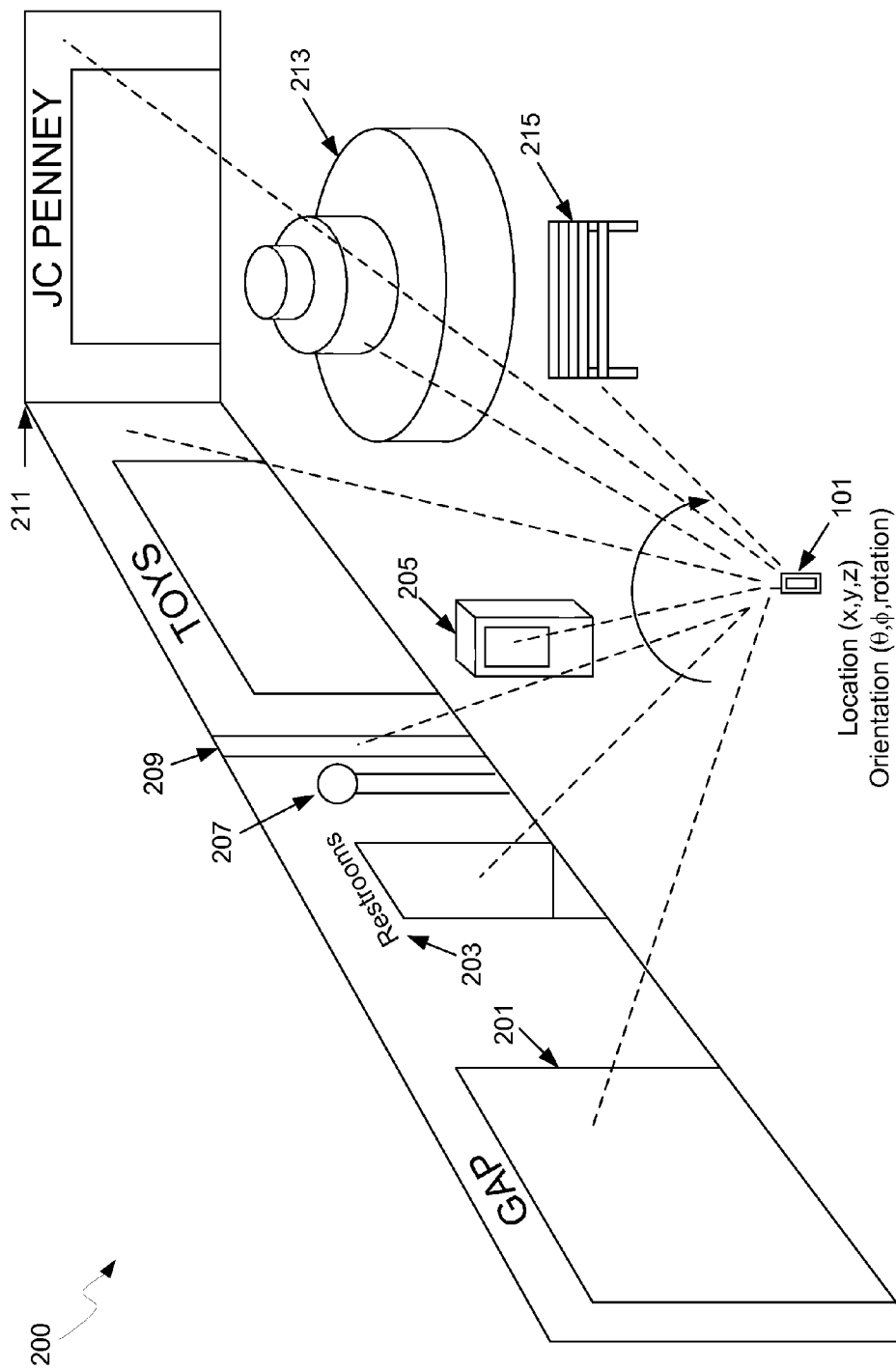
FIG. 2E is a diagram illustrating an exemplary building for map generation, in accordance with an embodiment of the invention.

FIG. 2E is a diagram illustrating an exemplary building for map generation, in accordance with an embodiment of the invention. Referring to FIG. 2E, there is shown a shopping mall 200 comprising a store front 201, a sign 203, a kiosk 205, a lamppost 207, a support column 209, a corner 211, a fountain 213, and a bench 215. There is also shown the wireless device 101, which may be located at location (x,y,z) with an orientation (Θ, φ, rotation), and may be operable to determine its location via various techniques. For example, the wireless device 101 may be operable to determine its position utilizing LEO satellite signals when present with sufficient signal strength. In addition, the wireless device 101 may be operable to determine its position with internal sensors in conjunction with a previous positioning, such as by GNSS, for example. The internal sensors may comprise one or more cameras, inertial sensors, compasses, and pedometers.

The wireless device 101 may be operable to capture images or video of its surroundings in the shopping mall 200 and communicate data and or the images with associated positioning data to a structural and/or textual database. In an exemplary scenario, once inside the shopping mall 200, the wireless device 101 may capture one or more images, or video, of the text and structures visible in the shopping mall 200. For example, the wireless device 101 may be used to scan from left to right, as illustrated by the curved arrow in FIG. 2A, capturing an image or images comprising the store front 201, the sign 203, the kiosk 205, the lamppost 207, the support column 209, the corner 211, the fountain 213, and the bench 215.

The wireless device 101 may then extract textual and/or structural elements from the captured images and may determine distances to the extracted elements based on the known optical characteristics of the camera within the wireless device 101. The determined distance, in conjunction with the direction the wireless device 101 was facing when the image was captured, may be utilized to determine a location of the elements. This data, comprising elements extracted from images and their position, may be uploaded to the database.

Using the time elapsed between images, together with the estimated distances from structural and textual elements, velocity (speed and direction) can be estimated, which acts as another input to the positioning system in the wireless device 101, which may comprise a compass and inertial sensors, for example. This may provide positioning data as the user travels from an initial positioning. As the position of the user becomes more distant from the original positioning, the data may be weighted less when entered into the database.

The database may comprise basic elements such as the name and 3D location of the structural or textual element; images or abstractions of the image of the structural element to allow for full characterization from any orientation relative to the element (including things like color of the element, and nearby structural elements). Feature extraction from image abstraction may be performed by the wireless device and/or by the system comprising the database.

The database may become more accurate as more and more users add data when visiting the shopping mall 200. Users may capture images of structures or text from different perspectives and under different lighting conditions, for example, which may result in better element recognition in future database use. Similarly, positioning errors may be averaged out with multiple image captures and positions of the same elements being uploaded.

The input to the database may be made through social networking activities, such as where users "check in" to their social network and add a picture with the associated location and/or positions of elements within the image. It should be noted that the invention is not limited to map generation for a shopping mall, but may be utilized in any location where GNSS positioning is not available, or is inadequate. For example, this may include sports arenas, train stations, airports, hospitals, or office buildings.

The database that receives data from the wireless device 101 may enable the positioning of wireless devices via the acquisition of images of structural or textual elements. Use of captured structural elements for positioning and navigation is described further in related application U.S. patent application Ser. No. 13/309,081, filed on Dec. 1, 2011, and the use of captured text for positioning and navigation is described further in related application U.S. patent application Ser. No. 13/328,413, filed on Dec. 16, 2011, both of which are herein incorporated by reference in their entirety.

Figure 3:
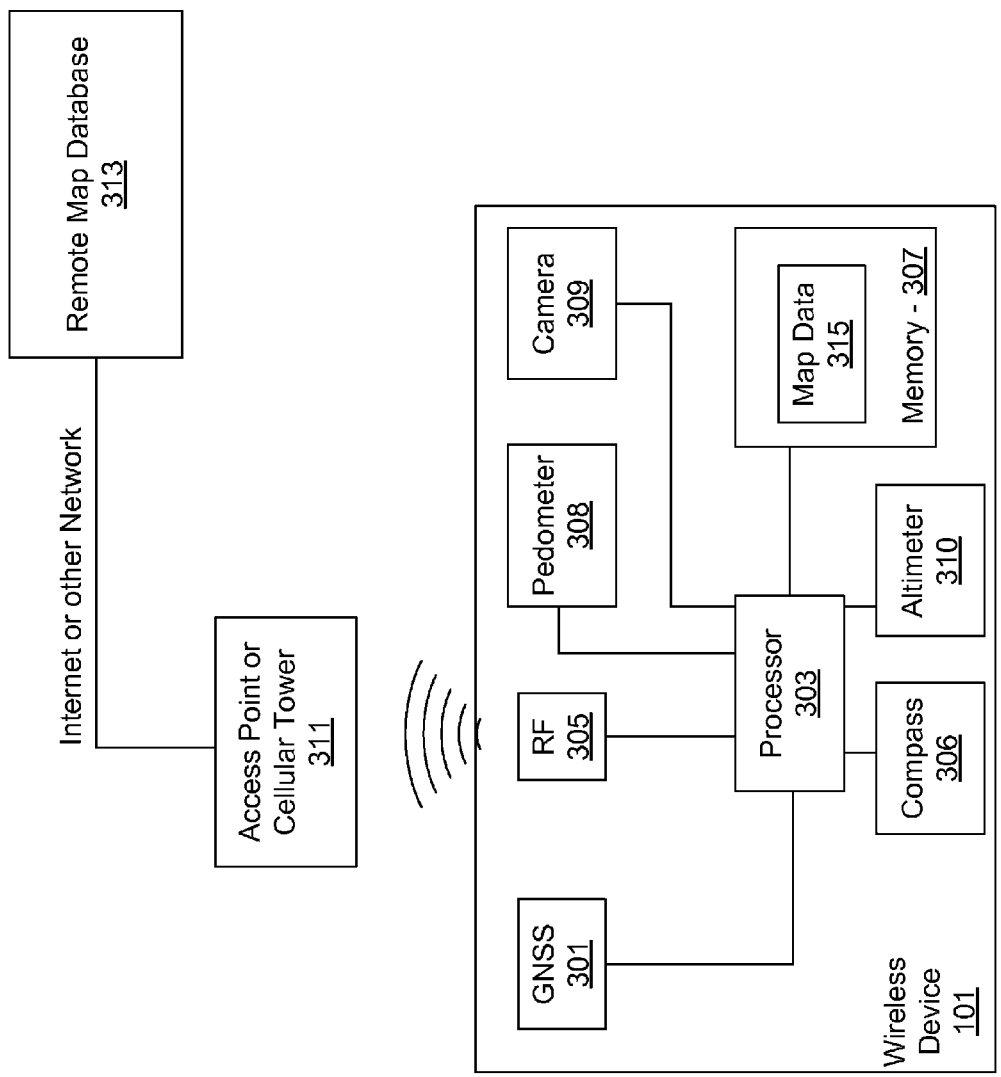
FIG. 3 is a block diagram illustrating an exemplary positioning wireless device for map generation, in accordance with an embodiment of the invention.

FIG. 3 is a block diagram illustrating an exemplary positioning wireless device for map generation, in accordance with an embodiment of the invention. Referring to FIG. 3, there is shown the wireless device 101 comprising a global navigation satellite system (GNSS) module 301, a processor 303, an RF module 305, a compass 306, a memory 307 comprising map data 315, a pedometer 308, and a camera 309. There are also shown an access point or cellular tower 311 and a remote map database 313.

The GNSS module 301 may comprise an RF receiver (Rx) path for receiving satellite signals for positioning functions. The GNSS module 301 may be operable to down-convert received RF signals to baseband and subsequently demodulate the baseband signals to obtain an accurate clock signal, such as a GPS clock signal. By receiving clock signals and ephemeris data from multiple satellites, the wireless device 101 may be operable to accurately determine its location.

The RF module 305 may comprise one or more RF Rx and transmit (Tx) paths for communicating with cellular towers or wireless access points, for example. The RF module 305 may comprise one or more antennas, low-noise amplifiers (LNAs), power amplifiers, mixers, local oscillators, variable gain amplifiers, filters, and analog-to-digital converters (ADCs), for example. The RF module may thus be operable to receive RF signals, amplify the signals before down-converting to baseband, filter out noise signals, and convert the resulting filtered signals to digital signals for processing by the processor 303. Similarly, the RF module may be operable to convert digital baseband signals to analog signals, upconvert the analog baseband signals to RF, amplify the resulting RF signals and transmit the amplified signals via an antenna.

Similarly, the RF module 305 may be operable to communicate RF signals comprising data from the map data 317 in the memory 307 to the remote map database 313. The data may be incorporated into baseband signals by the processor 303 and the baseband signals may then be upconverted by the RF module 305 for communication to the access point or cellular tower 311.

The compass 306 may be operable to determine the direction the wireless device 101 is pointing based on the Earth's magnetic field. The pedometer 308 may be operable to determine the number of steps that the user of the wireless device 101 takes, and accordingly calculate a distance traveled, given a known or measured stride length. The pedometer 308 may comprise a multi-dimensional accelerometer and/or a gyroscope, for example.

The memory 307 may comprise a programmable memory module that may be operable to store software and data, for example, for the operation of the wireless device 101. Furthermore, the memory 307 may store downloaded structural or textual data and calculated positions as determined by the wireless device 101. These data may be subsequently communicated to the remote map database 313.

The camera 309 may be operable to capture still and/or video images via a charge-coupled device (CCD) or complementary metal-oxide semiconductor (CMOS) imaging sensor and associated optical components, such as lenses and readout circuitry. The optical components may comprise one or more lenses with known focal lengths and focus settings for determining the distance to an object that is in focus, for example.

The altimeter 310 may be operable to determine an altitude of the wireless device 101 based on relative atmospheric pressure. The atmospheric pressure reading may be calibrated periodically by downloading local weather data to reduce inaccuracies caused by pressure changes from changing weather.

The processor 303 may comprise a general purpose processor, such as a reduced instruction set computing (RISC) processor, for example, that may be operable to control the functions of the wireless device. For example, the processor 303 may enable the GNSS module 301 when a user indicates a desire to determine their location. Similarly, the processor may utilize data from various sensors, such as to determine location when no GNSS signal is present. The processor may correlate a previously determined GNSS location to a measured distance and direction to determine a present location. The determined location and captured images and/or extracted structural and textual elements may be communicated to the remote map database 313.

The access point or cellular tower 311 may be operable to provide wireless connectivity to the wireless device 101 via the RF module 305. The access point or cellular tower 311 may enable access to the remote map database 313 via the Internet or other network.

The remote map database 313 may comprise data uploaded by users relating to structural and textual features of a building or other location where GNSS signals are not available. For example, the remote structural database 313 may comprise images of the structure of the building, and may comprise wireframe models of structures within the buildings. Similarly, the remote map database 313 may comprise images of text and/or extracted text with associated characteristics such as color, font, size, orientation, and patois.

In an exemplary scenario, wireless devices, such as the wireless device 101 may capture images and extract elements that may be useful for positioning for other users. This may comprise structural elements of the building, such as columns, corners, entrances, escalators, kiosks, fountains, or stairs, for example. Similarly, textual elements may be captured by the wireless device 101, which may comprise store signs, restroom signs, exit signs, or any other source of text. The wireless device 101 may determine its position by various means, such as using a pedometer and a compass after a previously determined GNSS position. The extracted elements, images, and determined positions may be uploaded to the remote map database 313. As more wireless devices upload such data to the database, the accuracy and amount of detail (i.e., the number of discrete elements) may be increased.

Figure 4:
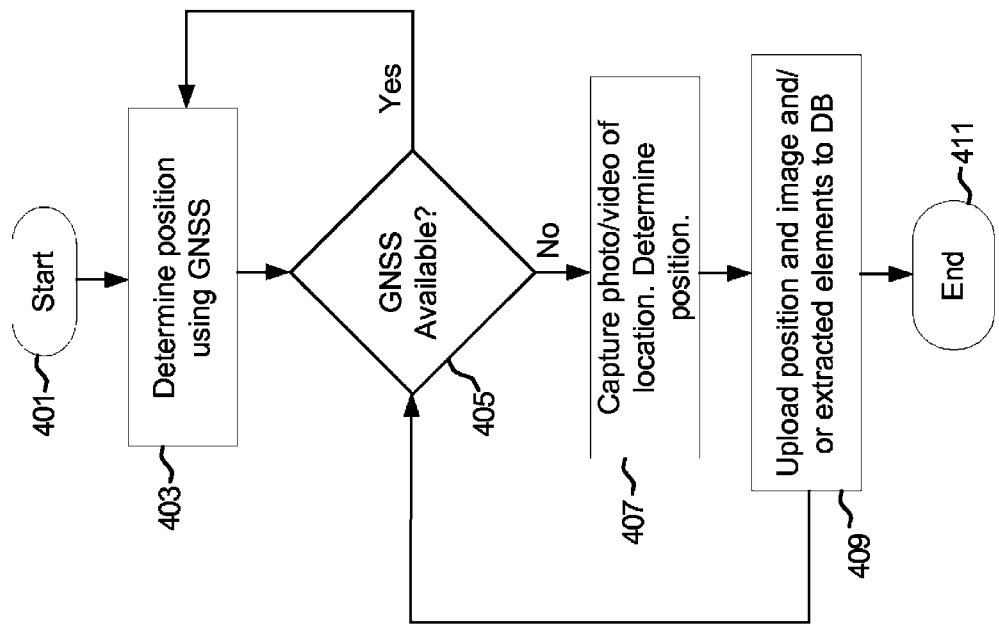
FIG. 4 is a block diagram illustrating exemplary steps in uploading elements to a map database, in accordance with an embodiment of the invention.

FIG. 4 is a block diagram illustrating exemplary steps in uploading elements to a map database, in accordance with an embodiment of the invention. The exemplary method illustrated in FIG. 4 may, for example, share any or all functional aspects discussed previously with regard to FIGS. 1-3. Referring to FIG. 4, after start step 401, in step 403, the wireless device may determine its location via GNSS (e.g., GPS).

In step 405, if GNSS signals are still available for positioning purposes, the exemplary steps may return to step 403 for continued GNSS positioning. If there are no GNSS signals, such as when the wireless device enters a building or other facility that attenuates GNSS signals below a threshold required for positioning purposes, the exemplary steps may proceed to step 407 where the wireless device may take one or more photo images or videos of the structural and textual features of the surroundings. For example, this may include one or more of corners, columns, archways, kiosks, fountains, hallways, storefront signs, exit/entrance signs, etc.

In step 407, the wireless device may also extract structural and textual elements from the captured images and determine their positions based on the previously GNSS-determined position and supplemental positioning sensors, such as a pedometer, a compass, and altimeter, for example. The optical properties of the camera system in the wireless device may assist in determining an accurate location of the structural and textual elements by determining a distance to an imaged element from the known position of the wireless device and in the known direction that the wireless device is facing.

In step 409, the elements and/or images may be uploaded to a map database along with the calculated positions of the elements. The exemplary steps may end at end step 411, or may continue back to step 405 if, for example, further motion of the wireless device is detected.

Figure 5:
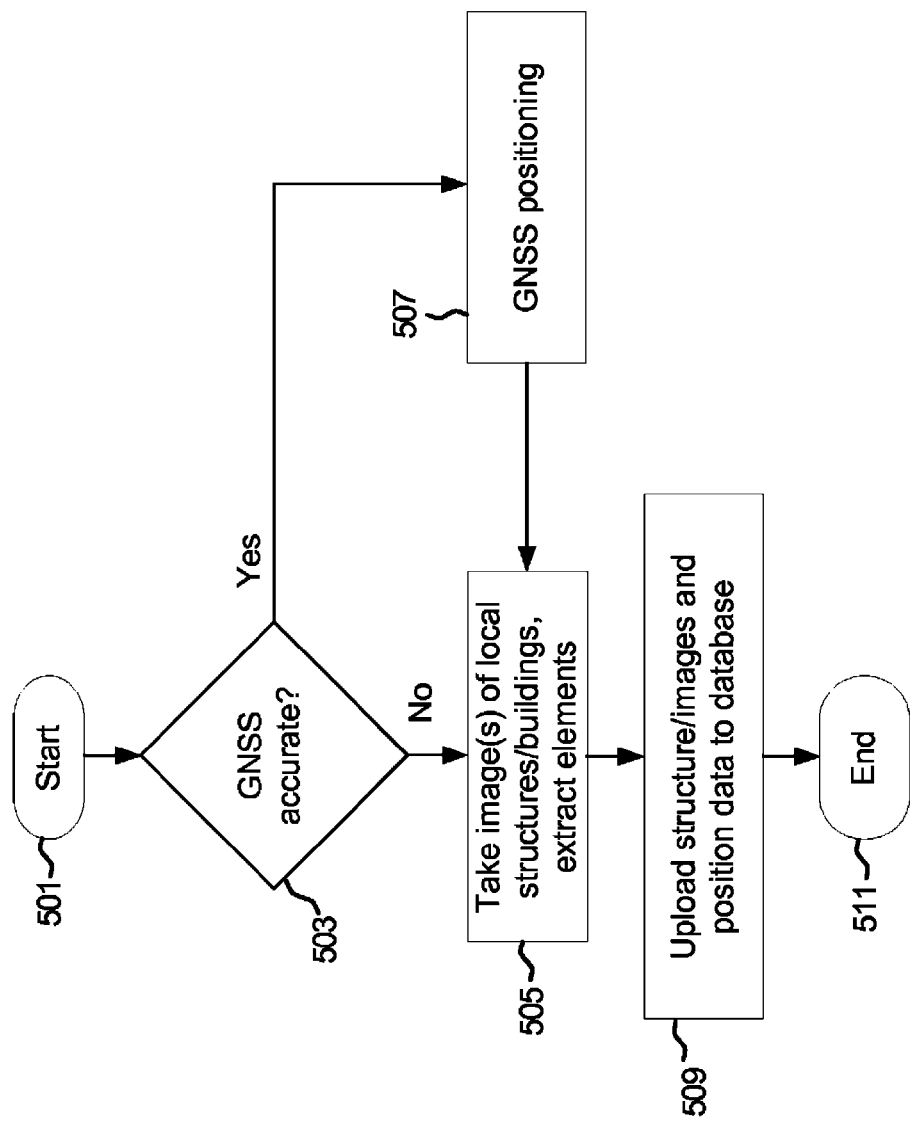
FIG. 5 is a block diagram illustrating exemplary steps for uploading to a database in outdoor locations with poor GNSS signals, in accordance with an embodiment of the invention.

FIG. 5 is a block diagram illustrating exemplary steps for uploading to a database in outdoor locations with poor GNSS signals, in accordance with an embodiment of the invention. The exemplary method illustrated in FIG. 5 may, for example, share any or all functional aspects discussed previously with regard to FIGS. 1-4. Referring to FIG. 5, after start step 501, in step 503, if the GNSS signal is weak or minimal satellites are within the field of view due to the wireless device being surrounded by tall buildings or other attenuating structures, the exemplary steps may proceed to step 505 where the wireless device may take one or more images or video of the surrounding structures.

If the GNSS signal is strong, and thus the accuracy of the positioning is high, the exemplary steps may proceed to step 507 for GNSS positioning followed by step 505 where images of structural and textual elements may be captured. These elements may also be extracted by the wireless device, followed by the determination of the distance to these elements through optical means, for example. For example, the position of the wireless device may be compared to the measured distance to elements in the images and the direction faced to determine the positions of elements in the captured images.

In step 509, data related to the structural and textual elements in the captured images or video may be uploaded to a structural and/or textual element database, along with the determined positions for these elements. As more and more users upload this information to the database, the higher the accuracy possible and the more detail possible for access by future users.

Figure 6:
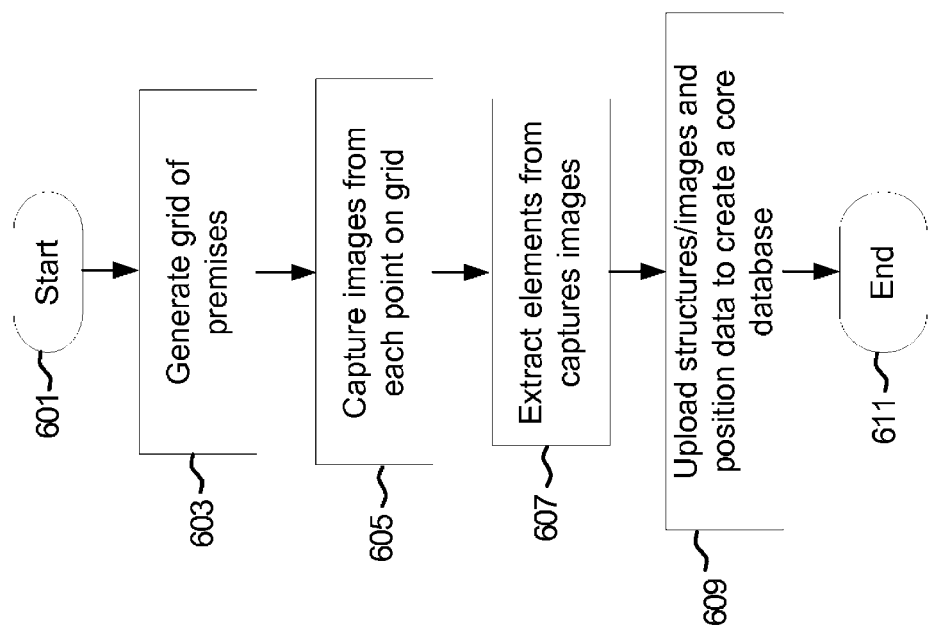
FIG. 6 is a flow diagram illustrating exemplary steps for generating a core premises map, in accordance with an embodiment of the invention.

FIG. 6 is a flow diagram illustrating exemplary steps for generating a core premises map, in accordance with an embodiment of the invention. The exemplary method illustrated in FIG. 6 may, for example, share any or all functional aspects discussed previously with regard to FIGS. 1-5. Referring to FIG. 6, after start step 601, in step 603, a grid may be generated to cover the area within a premises to be mapped. In step 605, one or more wireless devices may capture images or video of the premises from each of the points on the grid. In step 607, structural and/or textual elements may be extracted from the captured images.

In step 609, data related to the structural and textual elements in the captured images or video may be uploaded to a structural and/or textual element database, along with the determined positions for these elements, thereby generating a core premises map, followed by end step 611.

Figure 7:
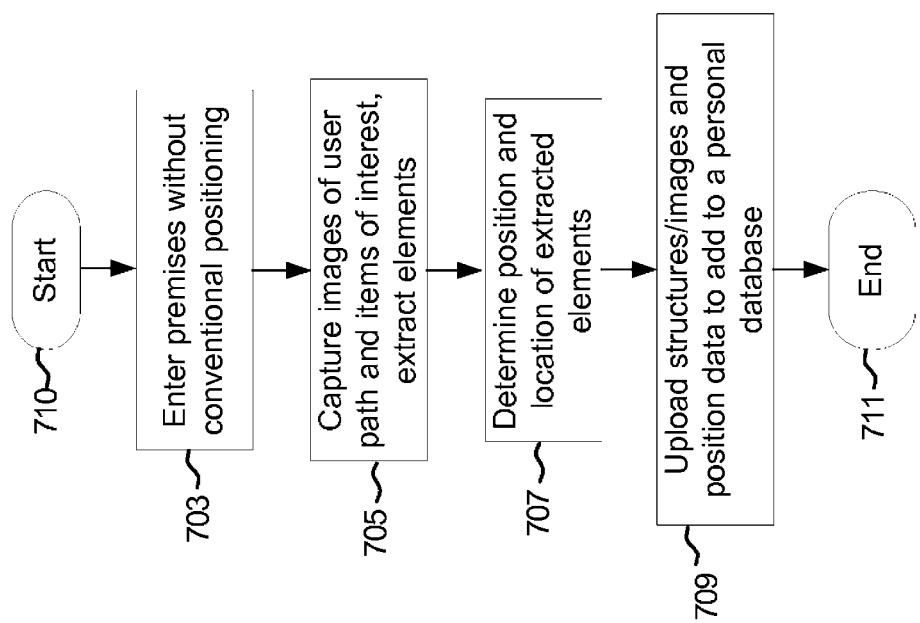
FIG. 7 is a flow diagram illustrating exemplary steps for generating personal maps, in accordance with an embodiment of the invention.

FIG. 7 is a flow diagram illustrating exemplary steps for generating personal maps, in accordance with an embodiment of the invention. The exemplary method illustrated in FIG. 7 may, for example, share any or all functional aspects discussed previously with regard to FIGS. 1-6. Referring to FIG. 7, after start step 701, in step 703, a wireless device user may enter a premises where conventional GNSS positioning is inadequate. In step 705, the wireless device may capture images of the path followed by the user and particular items of interest. For example, a user may capture images of desired gift items that may be shared with a spouse or other gift giver.

In step 707 the wireless device may determine its position and the position of imaged elements, followed by step 709 where data related to the structural and textual elements in the captured images or video may be uploaded to a structural and/or textual element database, along with the determined positions for these elements. The personal map may later be used by the same user or by another user to navigate to desired locations as per the first user's path.

Figure 8:
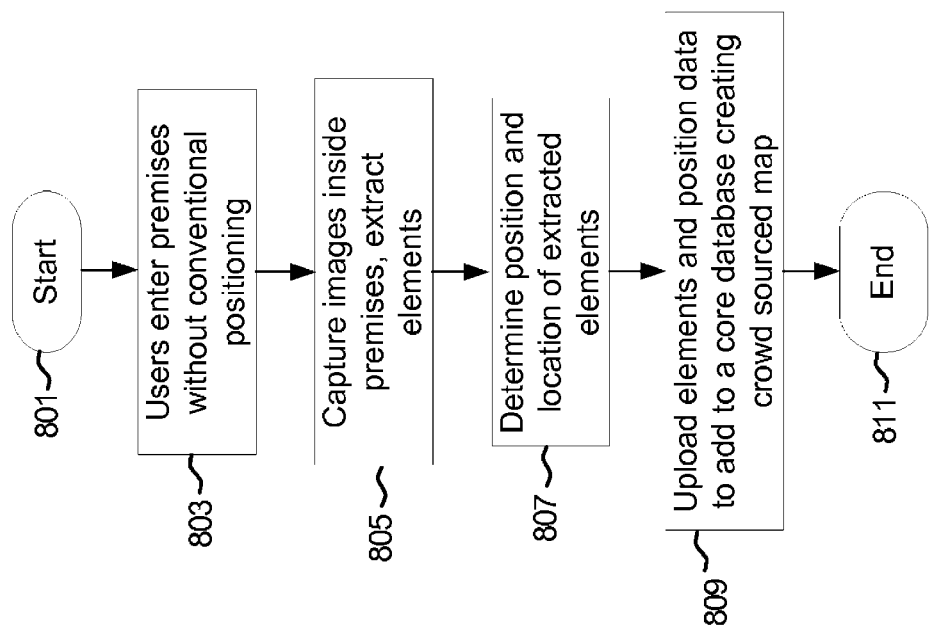
FIG. 8 is a flow diagram illustrating exemplary steps for generating crowd sourced maps, in accordance with an embodiment of the invention.

FIG. 8 is a flow diagram illustrating exemplary steps for generating crowd sourced maps, in accordance with an embodiment of the invention. The exemplary method illustrated in FIG. 8 may, for example, share any or all functional aspects discussed previously with regard to FIGS. 1-7. Referring to FIG. 8, after start step 801, in step 803, wireless device users may enter a premises where conventional GNSS positioning is inadequate. In step 805, the wireless devices may capture images of the premises as seen by the plurality of users. For example, a "flash mob" may be planned by a number of users, that may take images of the desired location within a premises.

In step 807 the wireless devices may determine their position and the position of imaged elements, followed by step 809 where data related to the structural and textual elements in the captured images or video may be uploaded and added to a core structural and/or textual element database, along with the determined positions for these elements, thereby creating a crowd-sourced map. The crowd-sourced map may later be shared and used by other users to navigate to desired locations.

In an embodiment of the invention, a method and system may comprise determining a position of a wireless communication device 101 and capturing one or more images of the surroundings of the wireless communication device 101. Data associated with objects 201, 203, 205, 207, 209, 211, 213, 215, 221A-221D, and 231 may be extracted from the one or more captured images and positions of the objects 201, 203, 205, 207, 209, 211, 213, 215, 221A-221D, and 231 may be determined, and the determined positions and the objects 201, 203, 205, 207, 209, 211, 213, 215, 221A-221D, and 231 may then be uploaded to a database 107, 313. The position of the wireless communication device 101 may be determined utilizing global navigation satellite system (GNSS) signals.

The elements may comprise structural features 201, 205, 207, 209, 211, 213, 215, 221A-221D, and 231 in the surroundings of the wireless communication device 101. The elements may comprise textual features 203 in the surroundings of the wireless communication device 101. The position of the wireless communication device 101 may be determined utilizing one or more sensors 306, 308, 309, and 310 in the wireless communication device 101 to measure a distance from a last determined or known position.

The one or more sensors 306, 308, 309, and 310 may comprise one or more of: a pedometer 308, an altimeter 310, a camera 309, and a multi-dimensional compass 306, multi-dimensional accelerometers 308, and gyroscopes 308. The positions of the extracted elements 201, 203, 205, 207, 209, 211, 213, 215, 221A-221D, and 231 may be determined utilizing known optical characteristics of a camera 309 in the wireless communication device 101. The database 107, 313 may comprise one or more of: a plurality of images, abstractions of images, and locations and may be stored on a remote server 105. The position of the wireless communication device 101 may be determined utilizing medium Earth orbit satellite signals and/or low Earth orbit satellite signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for map generation for location and navigation with user sharing/social networking.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
in connection with a crowd-sourced database that receives images and location data from a plurality of users of wireless communication devices, and for each of said plurality of users:
receiving a determined position of a wireless communication device, wherein the determined position is determined based at least in part on:
capture of one or more images of the surroundings of said wireless communication device; and
extraction from the captured one or more images, data associated with objects in the surroundings of said wireless communication device; and
updating said crowd-sourced database based on said determined position of said wireless device and said extracted data.

2. The method according to claim 1, comprising determining said position of said wireless communication device utilizing camera imaging and structural and/or textual features compared to features in said crowd-sourced database.

3. The method according to claim 1, wherein said data associated with objects in the surroundings of said wireless communication device comprise structural features in said surroundings of said wireless communication device.

4. The method according to claim 1, wherein said data associated with objects in the surroundings of said wireless communication device comprise textual features in said surroundings of said wireless communication device.

5. The method according to claim 1, comprising determining said position of said wireless communication device utilizing one or more sensors in said wireless communication device to measure a distance from a last determined or known position.

6. The method according to claim 5, wherein said one or more sensors comprise one or more of: a pedometer, an altimeter, a camera, multidimensional accelerometers, gyroscopes, and a multi-dimensional compass.

7. The method according to claim 1, comprising determining positions of said objects in the surroundings of said wireless communication devices utilizing known optical characteristics of a camera in said wireless communication device.

8. The method according to claim 1, wherein said database comprises one or more of: a plurality of images, abstractions of images, and locations.

9. The method according to claim 1, wherein said crowd-sourced database is stored on a server on a premises corresponding to the crowd-sourced database.

10. The method according to claim 1, wherein said wireless communication device comprises a device used by an owner and/or a proprietor of a premises corresponding to said crowd-sourced database.

11. The method according to claim 1, wherein said determined position is also determined based on a determination of positions of said objects in the surroundings of said wireless communication device, and wherein said updating said crowd-sourced database is also based on said determined positions of said objects.

12. A system for communication, the system comprising:
one or more circuits for use in connection with a crowd-sourced database that receives images and location data from a plurality of users of wireless communication devices, said one or more circuits being operable to, for each of said plurality of users:
receive a determined position of a wireless communication device, wherein the position is determined based at least in part on:
capture of one or more images of the surroundings of said wireless communication device; and
extraction from the captured one or more images, data associated with objects in the surroundings of said wireless communication device; and
update said crowd-sourced database based on said determined position of said wireless device and said extracted data.

13. The system according to claim 12, wherein said one or more circuits are operable to determine said position of said wireless communication device utilizing camera imaging and structural and/or textual features compared to features in said crowd-sourced database.

14. The system according to claim 12, wherein said data associated with objects in the surroundings of said wireless communication device comprise structural features in said surroundings of said wireless communication device.

15. The system according to claim 12, wherein said data associated with objects in the surroundings of said wireless communication device comprise textual features in said surroundings of said wireless communication device.

16. The system according to claim 12, wherein said one or more circuits are operable to determine said position of said wireless communication device utilizing one or more sensors in said wireless communication device to measure a distance from a last determined or known position.

17. The system according to claim 16, wherein said one or more sensors comprise one or more of: a pedometer, an altimeter, a camera, multidimensional accelerometers, gyroscopes, and a multi-dimensional compass.

18. The system according to claim 12, wherein positions of said objects in the surroundings of said wireless communication device are determined utilizing known optical characteristics of a camera in said wireless communication device.

19. The system according to claim 12, wherein said crowd-sourced database comprises one or more of: a plurality of images, abstractions of images, and locations.

20. The system according to claim 12, wherein said crowd-sourced database is stored on a server on a premises corresponding to the crowd-sourced database.

21. The system according to claim 12, wherein said wireless communication device comprises a device used by an owner and/or a proprietor of a premises corresponding to said premises-based crowd-sourced database.

22. The system according to claim 12, wherein said determined position is also determined based on a determination of positions of said objects in the surroundings of said wireless communication device, and wherein said updating said crowd-sourced database is also based on said determined positions of said objects.

23. A system for communication, the system comprising:
one or more circuits for use in connection with a crowd-sourced database that receives images and location data from a plurality of users of wireless communication devices, said one or more circuits being operable to, for each of said plurality of users:
receive a determined position of a wireless communication device based on a distance traveled from a last determined or known position, wherein the determined position is determined based at least in part on:
capture of one or more images of the surroundings of said wireless communication device; and
extraction from the captured one or more images, data associated with objects in the surroundings of said wireless communication device; and
update said crowd-sourced database based on said determined position of said wireless device and said extracted data.

* * * * *